March 22, 1938. N. J. KROLL ET AL 2,111,974
CARRIAGE
Filed Jan. 23, 1937
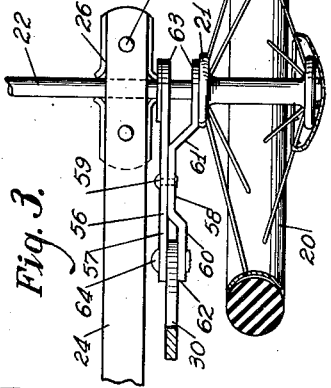
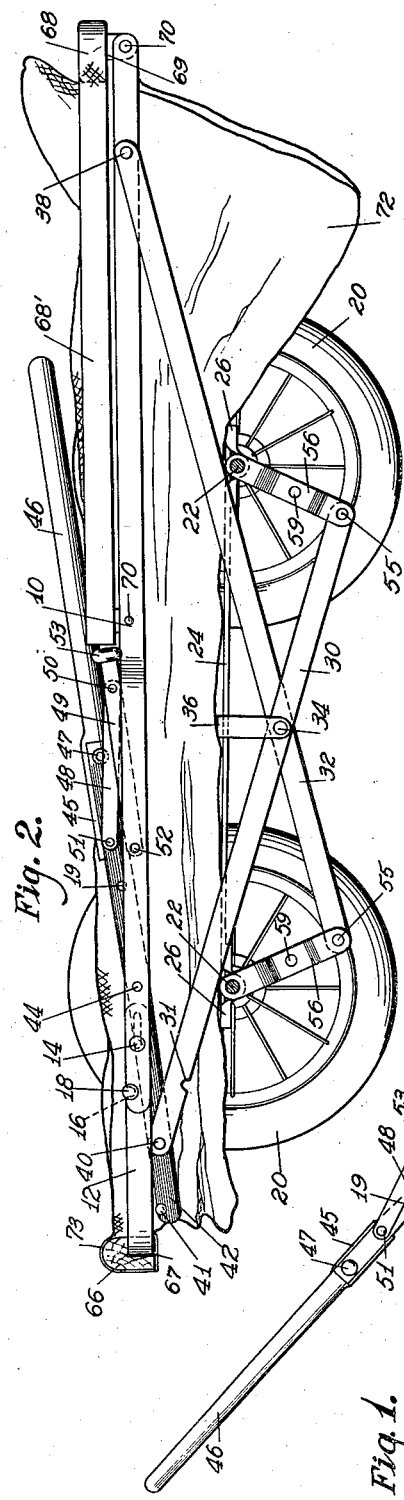
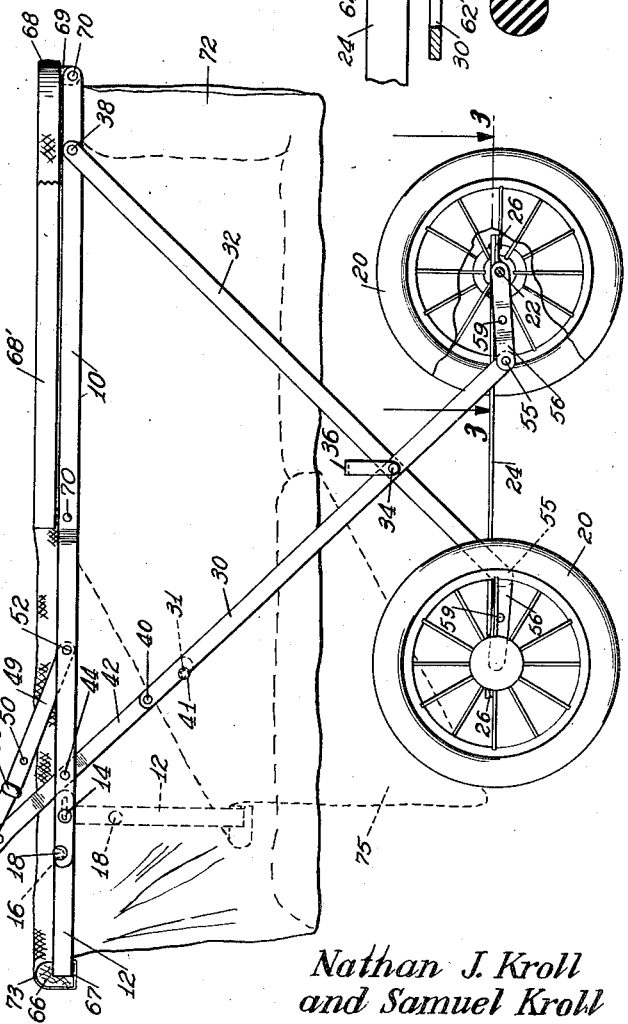
Nathan J. Kroll
and Samuel Kroll
INVENTORS
BY Clarence E. Threedy
THEIR ATTORNEY.

Patented Mar. 22, 1938

2,111,974

UNITED STATES PATENT OFFICE 2,111,974

CARRIAGE

Nathan J. Kroll and Samuel Kroll, Chicago, Ill.

Application January 23, 1937, Serial No. 121,949

9 Claims. (Cl. 280—41)

This invention discloses improvements in supporting devices and more particularly in vehicles such as perambulators and the like, and has among its important objects the provision of a simple, collapsible carriage structure having a novel lever arrangement for attachment of the wheels or other supporting standard whereby a degree of rocking movement may be had when the distribution of weight or center of gravity is shifted in the carriage cradle or seat.

A more specific object of the invention is the provision of a simplified structure of the class described, including a main frame, a fabric seat or cradle swung from said main frame, and the latter having a pair of side arms pivotally joined between their extremities and pivotally attached at their upper extremities on each side of the main frame and having shackle arms pivoted to their lowermost extremities and attached to the wheels.

Viewed from another aspect, the invention provides a very simple frame structure and means for attaching said frame structure to wheels in such manner that the main frame may be rocked on the wheels, the several frame members being pivotally joined in such manner that the whole structure may be readily collapsed into a compact bundle for easy transportation and handling.

Yet another object is the provision of a device of the class described above, in which a portion of the main frame may be lowered to convert the carriage and cradle part thereof into a seat having a footwell.

Other novel aspects and details of construction will appear as the following description proceeds in view of the annexed drawing, in which:

Fig. 1 is a side elevation of the improved carriage structure;

Fig. 2 is an enlarged view of the carriage in collapsed condition as seen with the wheels on the viewed side removed; while Fig. 3 is an enlarged top plan detail of the shackle arm and axle arm, as seen along line 3—3 in Fig. 1.

A preferred embodiment of the invention as seen in Fig. 1 includes a U-shaped main frame formed of a pair of oppositely disposed flat metal arms 10 pivotally attached to a bight member 12 by a pin-and-slot connection 14, each of the side arms 10 having a pin notch 16 formed adjacent their left-hand or innermost extremities for seating engagement with abutment pins 18 on the bight portion 12, it being noted here that the bight portion may be raised to remove the pins from slot 16 and thereafter slid toward the left to clear the ends of the side arms and drop the bight into the dotted line position, for reasons hereinafter to be pointed out.

The main frame is adapted to be supported upon a wheel and axle assembly including pairs of wheels 20 on axles 22 which are interconnected by chassis bars 24.

The bearing support of shafts 22 with the chassis bars 24 is provided by U-shaped straps 26 (see also Figs. 1 and 2) riveted, as at 28, to the flat metal chassis bars and having the axles 22 supported between the inner side of the bar 24 and the stirrup portion of the straps or clamps 26. It may be noted here that both the front and rear wheel assemblies are identical. The main frame assembly is supported from the wheel structure by means of twin pairs of main cross-arms 30 and 32 pivotally joined between their respective extremities, as at 34, with the said pairs interconnected by a U-shaped cross-bracket 36 attached thereto by the pivot pin 34. The uppermost extremity of each of the rods 32 of each pair is pivotally attached, as at 38, to the side arms 10 of the main frame, while the other cross-arms 30 of each pair are pivotally attached by pins 40 to arms 42 near their lowermost ends, the pivot arms 42 in turn being pivotally attached as at 44 intermediate their extremities to the side arms 10 of the main frame. Each of the arms 30, in addition, is provided with a notch 31 (Fig. 2) adapted to seat a stop pin 41 extended near the end of the pivot bars 42.

At their upper extremities, each of the pivot arms 42 is secured to the flattened end portion 45 of a tubular and U-shaped handle 46 by means of rivets 47 extended through the same; thus by movement of the handle 46 in an anticlockwise direction about the pivotal points 44, the pins 41 at the lower ends of arms 42 may be urged into the notches 31 on the cross-arms 30, with the cross-arms disposed in the condition seen in Fig. 1. In order to maintain the pivot arms 42 and cross-arms 30 and 32 in extended condition, a pair of toggle arms 48 and 49 are pivotally joined together, as at 50, and respectively attached at their other free extremities by means of pins 51 and 52 to the end portion 45 of the handle 46 and the side arms 10 of the main frame, respectively. The toggle arm 48 is provided with a handle 53 by which the toggle may be extended and "set" to prevent forward or clockwise movement of the handle about its pivotal point 44, pin 19 limiting this setting movement.

Pivotally attached, as at 55, to the lowermost extremities of each of the arms 30 and 32 of each pair on both sides of the main frame, are shackle arms 56 which in turn are pivotally attached to the axles 22 between the axle clamps 26 and the hubs 21 of wheels 20.

The shackle arms 56 are formed by a pair of elongated straps 57 and 58 pivotally joined intermediate their respective extremities by a rivet or the like 59, and with the strap 58 having offset end portions 60 and 61 formed at its extremities to provide yokes 62 and 63, each having axially aligned openings, the openings in the yoke 63 receiving the shaft 22 while the lowermost end portion of each of the cross-arms 30 and 32 are received in the yoke portions 62 of their respective shackle arms and are pivotally secured therein by means of pins 64.

The main frame is provided with a top rail 66 having an elongated channel 67 adapted to fit upon the back or bight portion of the frame, while the forward end of the frame is provided with a raised top rail 68 having depending lugs 69 attached to the side arms 10, as at 70, the rail 68 including side arm portions 68' which overlie the forward ends of side arms 10, and a front or bight portion which extends across the otherwise open end of the main frame. Both the rails 66 and 68 may, if desired, be constructed of wood.

A fabric seat or cradle bag 72 is hung from the main frame and attached at its left-hand extremity to the end top rail 66 by having a portion 73 folded over the top rail and secured by one or another means to the rail itself on the under-surfaces thereof, or by having the folded portion attached to the body of the bag or fabric as by sewing. At the opposite end of the carriage the cradle fabric is stretched over the front top rail 68 and similarly attached to the underside thereof, or to the fabric itself. The upper edge of the fabric intermediate the rear top rail 66 and the edge of the front top rail 68, and which lies approximately in the middle of the main frame, is stretched taut, as seen in Fig. 1, to trim or level the upper edge of the carriage well or cradle when the device is in its extended condition.

The carriage cradle may be converted into a seat having a footwell 75, indicated in dotted lines in Fig. 1, by raising the portion of the main frame adjacent the rear top rail 66 so as to lift the bight portion 12 of the frame upwardly and cause the stopping pins 16 to be lifted out of their seating notches 31, whereupon the elongated slot of the pin-and-slot attachment 14 will permit the bight portion 12 of the frame to be slid away from the carriage so that the pins 16 may clear the ends of the side arms 10, with the bight portion 12 dropping into dotted line position, and the cradle fabric intermediate the left end of the frame and its approximate center above the cross-bracket 36 will correspondingly drop, and the bottom part of the fabric will lie at an angle to form a suitable leg rest in the resulting footwell.

The carriage is adapted to be folded into the compact and portable device seen in Fig. 2, and this may readily be accomplished by grasping the handle 46 of the erected or opened carriage seen in Fig. 1, and pressing both of the toggle handles 53 upwardly so as to break the toggle joint and thereafter pivoting the handle 46 about its pivot 44 in a clockwise direction until it assumes the position seen in Fig. 2. Simultaneously with this operation the pin 41 at the lower end of the pivot arm 42 will move in a clockwise direction out of its seating slot 31 in arm 30, and both of the arms 30 and 32 of each pair will be diverged about the pivotal point 34 and move their respective shackle arms 56 into the lowered positions seen in Fig. 2. The canvas cradle bag readily collapses with the descent of the main frame toward the chassis bars 24.

The leverage system represented by the cross-arms, shackle arms, and the handle pivot arms is such that the carriage may be very quickly erected from its collapsed condition, as seen in Fig. 2, by simply grasping the handle 46 and raising the same, whereupon the main frame member with its fabric cradle rises substantially upward from the heavier wheel assembly and when the handle has reached the limit of its movement in an anti-clockwise direction, the toggle arms 48 and 49 may be set and the carriage is ready for use.

Another important characteristic of the leverage system represented by the frame structure resides in the shackle arms 56. When the weight in the carriage well or cradle is evenly distributed, the shackle arms and cross-arms are substantially in the position shown in Fig. 1. However, when the weight or center of gravity is shifted toward one or the other end of the cradle and away from the central point represented by the cross-support 36, the main frame and cross-arm structure will pivot in a direction corresponding to the direction of displacement of weight and substantially about the point 34 as an axis. Thus, without the use of springs or the like the carriage may be said to be supported in a floating condition relative to the wheel structure, and a freedom of movement provided therefor which in many respects is more suitable than that which could be achieved by spring suspension, and the floating effect is likewise operative whether the carriage be converted into a seat with a footwell or an ordinary carriage with a cradle.

While a preferred embodiment of the invention has been set forth in detail for purposes of description, it is to be understood that this embodiment is illustrative of the invention which is not to be limited to the precise details recited, but which is to be interpreted broadly in view of the appended claims.

Having thus described our invention, what we claim as new and desire to protect by Letters Patent is:

1. A carriage including a wheel structure having a pair of axles, a carriage cradle structure and means for collapsibly supporting said cradle structure upon said wheel structure and including a pair of depending scissor arms pivotally connected near their respective upper portions with said cradle structure, and at their respective opposite and lower ends to a radial shackle arm on one of said axles, together with releasable lever mechanism operable to prevent relative pivotal movement of said scissor arms and said cradle structure.

2. A carriage comprising a main upper frame having a cradle part depended therefrom and supported on a wheel structure by means of pairs of cross-arms pivoted intermediate their respective extremities and attached to the wheel structure by means of shackle arms pivotally connected at their respective lower extremities, the said shackle arms in turn being pivotally attached to the axle part of the wheel structure, while one opposite or upper extremity of each cross-arm of each pair on opposite sides of the frame is pivotally connected to said main frame on each side of the same and the upper extremity of the remaining cross-arm of each said pair is pivotally attached to a pivot arm which in turn is pivotally attached intermediate its extremities to said main frame, the outer or free extremties of each of said pivot arms being joined by a handle member attached thereto, lever means interconnecting said main frame and the handle extremity of said pivot arm and adapted to hold the same in a determined position relative to said frame, together with means for limiting the relative pivotal movement of said pivot arm and the one of said cross-arms to which it is attached.

3. A carriage including a main upper frame adapted to support a flexible cradle therefrom, a wheel structure for said carriage including a chassis and spaced wheel axles supported thereby, and means for supporting said main frame on said wheel structure and including a pair of elongated cross-arms pivotally joined intermediate their extremities, one said pair being disposed on either side of said main frame and the lowermost extremities of each arm of each pair being pivotally attached to a shackle arm which in turn is pivotally attached to said axles, the uppermost extremity of one cross-arm of each said pair being pivotally attached to said main frame and the uppermost extremity of each remaining cross-arm of each pair being pivotally attached to a pivot arm, said arm in turn being pivotally attached intermediate its extremities to said main frame and having its end portion opposite its pivotal conection with said cross-arm attached to handle means and to a toggle device operable to limit the movement of said pivot arm relative to said main frame, together with means on said pivot arm and the cross-arm to which it is linked as aforesaid for limiting the relative movement of said pivot arm and said cross-arm.

4. A carriage comprising a main upper frame and a folding cradle structure attached thereto, a wheel structure including a pair of axle members and foldable means for supporting said main frame on said wheel structure and including a pair of elongated cross-arms on opposite sides of said frame and the arms of each pair being pivotally joined intermediate their respective extremities and pivotally linked with said main frame at the upper end parts, the lowermost portions of said cross-arms being each pivotally attached to a shackle arm pivotally engaging one of said axle members.

5. A carriage comprising a main upper frame, a carriage cradle supported by said frame, a wheel structure including a pair of axles, and foldable means for supporting said main frame upon said wheel structure and including a pair of elongated cross-arm units disposed one on either side of said main frame, and the arms of each pair being pivotally joined intermediate their respective extremities, means pivotally attaching the upper extremities of each cross-arm of each pair to said main frame, and a pair of radially movable shackle arms attached to each of said axles and each attached adjacent its respective radial extremity to a lower end of one of said cross-arms.

6. A folding carriage comprising a U-shaped upper frame having its bight portion pivotally joined to its opposite side portions, a folding cradle suspended from said frame, releasable means on said frame for maintaining said bight portion in raised position relative to opposite side portions thereof, a wheel structure including a pair of axles and folding means for supporting said main frame on said wheel structure and including a pair of elongated cross-arms and means pivotally attaching the same to said main frame at points along said opposite side portions thereof, said means including a pivot arm pivotally attached between its ends to said main frame on either side thereof, one lower end of each said pivot arm being pivotally attached to an upper end of said pivot arms being joined by handle means, stop means near the juncture of said pivot and cross-arms for limiting relative movement of the same in one direction, the said arms of each pair being pivotally joined intermediate their respective extremities and each being attached at its lower extremity to a shackle arm movable radially on one of said axles, said cross-arms being pivotable to permit the folding of said main frame toward and upwardly of said wheel structure, and lever means cooperable with said main frame and said cross-arm structure to prevent such folding movement and maintain said frame and cradle in raised position relative to the wheel structure.

7. A carriage comprising a main frame including a pair of opposite side arms, a cross-arm pivotally attached to each of said side arms, a flexible cradle member suspended from said main frame and to said cross-arm thereof, the latter being pivotable into a lowered position relative to said side arms and being adapted to lower a portion of said cradle correspondingly, means for preventing the relative movement of said cross-arm and side arms of the main frame, a wheel structure including a pair of axles and means for supporting said main frame upon said wheel structure, said means including a pair of shackle arms supported for radial movement on each of said axles, a pair of elongated cross-arms joined intermediate their extremities and having their lowermost extremities pivotally attached to said shackle arms at points radial to said axles, one said pair of cross-arms being disposed on either side of the main frame and one cross-arm of each said pair being pivotally attached adjacent its uppermost extremity to a said side arm of the main frame, the remaining cross-arm of each said pair being pivotally attached adjacent its uppermost extremity to a pivot arm which is pivotally attached intermediate its extremities to a said side arm of said frame, abutment means for limiting the relative pivotal movement of said pivot arm and the cross-arm attached thereto and said pivot arms being joined by a handle member at their free ends opposite the juncture with said cross-arms, and releasable means linking said side arms and said free extremities of said pivot arms for preventing relative movement of the latter to the former.

8. A collapsible carriage and seat in the form of a main frame consisting of a pair of spaced side arms joined by a cross-arm pivotally attached thereto and movable from substantially horizontal to a lowered relation thereto, a cradle bag suspended from said frame and having a body portion attached to and movable with said cross-arm so as to provide a substantially level bottom in the cradle when said cross-arm is raised or a footwell below a portion of said bottom when said arm is lowered, means on said frame for maintaining said cross-arm in raised position, a wheel structure including a pair of axles, and collapsible means for supporting said main frame on said wheel structure, said means including pivot arms pivotally attached between their extremities to each of said side arms of the frame, handle means attached to the upper ends of said pivot arms, means attached to said frame and said pivot arms for preventing movement of one relative to the other, a pair of crossed arms pivotally joined between their extremities and disposed one pair on each side of the main frame and cradle, one arm of each said pair being pivotally attached at its upper end to a said side arm of the frame, and the remaining arm of each pair being pivotally attached at its upper end to the lower end of a said pivot arm, means for limiting the pivotal movement of the latter to the former, and each of said crossed arms being supportably and movably attached to said wheel structure by means of radially extensive shackle arms pivoted on said axles and pivotally attached to the end portions of one of each of said crossed arms and at a point radially away from said axles.

9. A collapsible baby carriage including a wheel chassis having a pair of spaced axles, cross-arms pivotally connected at a point intermediate their respective ends and arranged in pairs, the lower ends of each of the arms of each pair being pivotally connected to said spaced axles, whereby said pairs of arms may be folded toward and away from said chassis, frame means in the form of opposite elongated members, each having pivotal connection with one of the corresponding arms of each said pair, pivot arms pivotally attached between their ends to one of each of said elongated side arms near the ends of the latter opposite the pivotal connection of the same with said first-mentioned cross-arms, each of said pivot arms having pivotal connection at a point spaced from the lower ends thereof with the upper end of the remaining opposite cross-arms of each pair, each of said latter arms having pin means engageable with the end portions of said pivot arms for limiting the movement of the same in one direction, handle means adjoining the upper ends of said pivot arms, lever means connecting said elongated side arms and said pivot arms between the handle means of the latter and the pivotal connection of the same with said elongated side arms for releasably preventing relative movement of said side arms, and means supporting a carriage well from said elongated side arms.

NATHAN J. KROLL.
SAMUEL KROLL.